US010539669B2

(12) United States Patent
Ikram et al.

(10) Patent No.: US 10,539,669 B2
(45) Date of Patent: Jan. 21, 2020

(54) THREE DIMENSIONAL (3D) TRACKING OF OBJECTS IN A RADAR SYSTEM

(71) Applicant: Texas Instruments Incorporated, Dallas, TX (US)

(72) Inventors: Muhammad Zubair Ikram, Richardson, TX (US); Murtaza Ali, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 412 days.

(21) Appl. No.: 14/877,888

(22) Filed: Oct. 7, 2015

(65) Prior Publication Data
US 2016/0103213 A1    Apr. 14, 2016

Related U.S. Application Data

(60) Provisional application No. 62/061,482, filed on Oct. 8, 2014.

(51) Int. Cl.
*G01S 13/42* (2006.01)

(52) U.S. Cl.
CPC .................... *G01S 13/42* (2013.01)

(58) Field of Classification Search
CPC ...... G01S 13/42; G01S 13/584; G01S 13/723; G01S 13/931
USPC ........................................................ 342/105
See application file for complete search history.

(56) References Cited

U.S. PATENT DOCUMENTS 6,085,151 A * 7/2000 Farmer ............... G01S 7/023
342/70
2012/0140061 A1 6/2012 Zeng

OTHER PUBLICATIONS

"Radar Tracker", Wikipedia, pp. 1-6, available at https://en.wikipedia.org/wiki/Radar_tracker on Oct. 13, 2015.
Y. Bar-Shalom and T.E. Fortmann, "Tracking and Data Association", Academic Press, Inc., Orlando, Florida, 1988, pp. 106-109.
M. A. Richards, "Fundamentals of Radar Signal Processing", McGraw-Hill, New York, New York, 2005, pp. 115-121.
(Continued)

*Primary Examiner* — Timothy A Brainard
(74) *Attorney, Agent, or Firm* — Ebby Abraham; Charles A. Brill; Frank D. Cimino (57) ABSTRACT

A method for tracking objects in three dimensions in a radar system is provided that includes receiving spherical coordinates of an estimated location of each object of a plurality of detected objects, a range rate of each object, and variances for the spherical coordinates and the range rate of each object, determining whether or not each object is currently being tracked, updating a tracking vector for an object based on the object spherical coordinates, range rate, and variances when the object is currently being tracked, and initializing a tracking vector for an object when the object is not currently being tracked, wherein a tracking vector for an object is a process state vector for an extended Kalman filter designed to track an object, elements of the tracking vector including Cartesian coordinates of the object location, the object velocity in three directions, and the object acceleration in three directions.

20 Claims, 6 Drawing Sheets

(56) References Cited

OTHER PUBLICATIONS

R. Okuda, et al., "A Survey of Technical Trend of ADAS and Autonomous Driving", Proceedings of 2014 International Symposium on VLSI Technology, Systems and Application, Apr. 28-30, 2014, Hsinchu, Taiwan, pp. 1-4.
M. Schneider, "Automotive Radar—Status and Trends", Proceedings of German Microwave Conference, Apr. 2005, pp. 144-147.
"Kalman Filter", Wikipedia, pp. 1-29, available at https://en.wikipedia.org/wiki/Kalman_filter on Oct. 4, 2015.
M. Z. Ikram and M. Ali, "3-D Object Tracking in Millimeter-Wave Radar for Advanced Driver Assistance Systems", 2013 IEEE Global Conference on Signal and Information Processing, Dec. 3-5, 2013, Austin, TX, pp. 723-726.
"Extended Kalman Filter", Wikipedia, pp. 1-7, available at https://en.wikipedia.org/wiki/Extended_Kalman_filter on Oct. 4, 2015.
J. Dickmann, et al., "Making Bertha See", Spectrum.IEEE..org, Aug. 2014, pp. 46-49.
J. Hasch, et al., "Millimeter-Wave Technology for Automotive Radar Sensors in the 77 GHz Frequency Band," IEEE Transactions on Microwave Theory and Techniques, vol. 60, No. 3, Mar. 2012, pp. 845-860.
M. Z. Ikram and Ali, A New Data Association Method for 3-D Object Tracking in Automotive Applications, 2014 IEEE Radar Conference, May 19-23, 2014, Cincinnati, OH, pp. 1187-1191.
D. Oprisan and H. Rohling, "Tracking Systems for Automotive Radar Networks", RADAR 2002, Oct. 15-17, 2002, Edinburgh, UK, pp. 339-343.
A. G. Stove, "Obstacle Detection Radar for Cars", Electronics & Communication Engineering Journal, Oct. 1991, pp. 232-240.

\* cited by examiner

THREE DIMENSIONAL (3D) TRACKING OF OBJECTS IN A RADAR SYSTEM

CROSS-REFERENCE TO RELATED APPLICATIONS

This application claims benefit of U.S. Provisional Patent Application Ser. No. 62/061,482, filed Oct. 8, 2014, which is incorporated herein by reference in its entirety.

BACKGROUND OF THE DISCLOSURE

Field of the Disclosure

Embodiments of the present disclosure generally relate to radar systems, and more specifically relate to tracking of objects in radar systems.

Description of the Related Art

A new class of safety systems, referred to as advanced driver assistance systems (ADAS), has been introduced into automobiles to reduce human operation error. Such systems may provide functionality such as rear-view facing cameras, electronic stability control, and vision-based pedestrian detection systems. ADAS systems are enabled by smart sensors based primarily on millimeter-wave (mmWave) automotive radar systems. Such radar systems may employ frequency-modulated continuous wave (FMCW) transmissions, which provide wide transmit bandwidth and high average power output.

In an automotive radar system, one or more radar sensors may be used to detect and determine positions of objects around a vehicle as well as the speeds of the detected objects relative to the vehicle. A processing unit in the radar system may determine the appropriate action needed, e.g., to avoid a collision or to reduce collateral damage, based on signals generated by the radar sensors. Current automotive radar systems are capable of detecting objects and obstacles around a vehicle, the position of any detected objects and obstacles relative to the vehicle, and the velocity of any detected objects and obstacles relative to the vehicle. Tracking of detected objects may also be provided. Object tracking is complicated by multiple objects leaving and entering the vicinity of the vehicle either due to movement of the vehicle or movement of the objects.

SUMMARY

Embodiments of the present disclosure relate to methods and apparatus for three dimensional tracking of objects in a radar system. In one aspect, a method for tracking objects in three dimensions in a radar system is provided that includes receiving spherical coordinates of an estimated location of each object of a plurality of objects detected in a frame of radar signals, a range rate of each object, and variances for the spherical coordinates and the range rate of each object, determining whether or not each object of the plurality of objects is currently being tracked, updating a tracking vector for an object based on the spherical coordinates, range rate, and variances of the object when the object is currently being tracked, and initializing a tracking vector for an object when the object is not currently being tracked, wherein a tracking vector for an object is a process state vector for an extended Kalman filter designed to track an object, elements of the tracking vector including Cartesian coordinates of a location of the object, velocity of the object in three directions, and acceleration of the object in three directions.

In one aspect a radar system configured to track objects in three dimensions is provided that includes an object detection component configured to detect objects in frames of multi-channel radar signals, and to estimate range, range rate, range variance and range rate variance for each detected object, a position estimation component configured to estimate elevation, azimuth, elevation variance, and azimuth variance for each detected object, and an object tracking component configured to track detected objects over time in three dimensions based on the range, range rate, range variance, range rate variance, elevation, azimuth, elevation variance, and azimuth variance of the detected objects.

In one aspect, a radar system is provided that includes a processing unit, and a memory storing software instructions that, when executed by the processing unit, cause the radar system to perform a method for tracking objects in three dimensions. The method includes receiving spherical coordinates of an estimated location of each object of a plurality of objects detected in a frame of radar signals, a range rate of each object, and variances for the spherical coordinates and the range rate of each object, determining whether or not each object of the plurality of objects is currently being tracked, updating a tracking vector for an object based on the spherical coordinates, range rate, and variances of the object when the object is currently being tracked, and initializing a tracking vector for an object when the object is not currently being tracked, wherein a tracking vector for an object is a process state vector for an extended Kalman filter designed to track an object, elements of the tracking vector including Cartesian coordinates of a location of the object, velocity of the object in three directions, and acceleration of the object in three directions.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency.

Embodiments of the disclosure provide for three dimensional (3D) tracking of multiple objects detected in radar signals, the three dimensions being the x, y, and z Cartesian coordinates of the objects determined from the range, elevation, azimuth, and range rate of the objects. With the 3D tracking described herein, detected objects may be tracked relative to a moving vehicle whether the objects are stationary or are moving in varying directions with differing acceleration.

Figure 1:
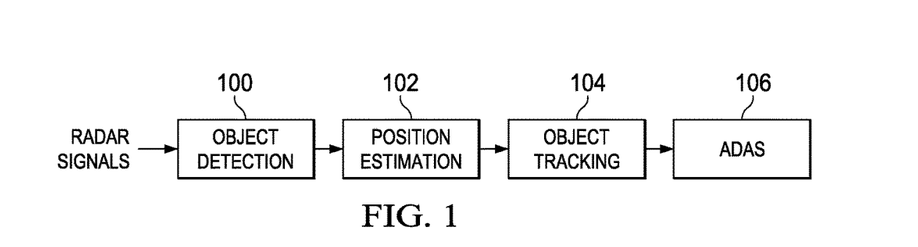
FIG. 1 is a block diagram illustrating radar signal processing for an ADAS system.

FIG. 1 is a block diagram illustrating radar signal processing for an ADAS system in accordance with some embodiments. Techniques for object detection and estimation of range, range rate, elevation, and azimuth and corresponding variances mentioned below are well-known and are not described in detail.

Frames of digital radar signal data from multiple receive channels coupled to a two-dimensional antenna array are initially processed by the object detection component 100. The object detection component 100 includes functionality to matched filter the multi-channel radar signals to detect objects and to estimate the range and range rate of any detected objects. Range rate, which may also be referred to as radial velocity, is the rate of change of the range. In addition, variances for the range and range rate estimates are determined.

The position estimation component 102 includes functionality to estimate the positions of any detected objects relative to the antenna array. That is, the elevation and azimuth for each object is estimated. In addition, variances for the elevation and azimuth estimates are determined.

The object tracking component 104 includes functionality to track detected objects over time according to an embodiment of the method for three dimensional (3D) object tracking described herein. As is described in more detail in reference to the method of FIG. 3, the object tracking component 104 receives the estimated spherical coordinates, i.e., the range, the elevation, and the azimuth, the estimated range rate, and the corresponding variances for each of the detected objects in each frame of radar signal data and uses this information to track the objects over time. An extended Kalman filter as described herein tracks each object using the estimated spherical coordinates of the object as well as the estimated range rate and the respective corresponding variances of the estimated values.

The ADAS component 106 receives updated tracking data from the object tracking and uses this data as needed for the applications implemented by the component, e.g., for collision avoidance and/or automatic parking.

As is well known to those of ordinary skill in the art, a Kalman filter, i.e., a linear quadratic estimation algorithm, uses a series of measurements observed over time, which may include statistical noise and other inaccuracies, to produce estimates of unknown variables. The general filter algorithm is a recursive two-step process, the two steps being a prediction step, also known as a process step or a time step, and an observation step, also known as a measurement step. Given the outcome of a measurement step in which the outcome is corrupted by some amount of error and noise, i.e., some variance, the process step updates the variable estimates. More specifically, the variable estimates at time n are predicted based on estimated variable values at time n−1 in view of the variance.

A Kalman filter can execute in real time using only current input measurements and the previously calculated state along with an uncertainty matrix. An extended Kalman filter is a nonlinear version of a Kalman filter which linearizes about an estimate of the current mean and covariance. That is, the state transition (process) and observation (measurement) models may be differentiable functions of the state rather than linear functions as in the Kalman filter.

Figure 2:
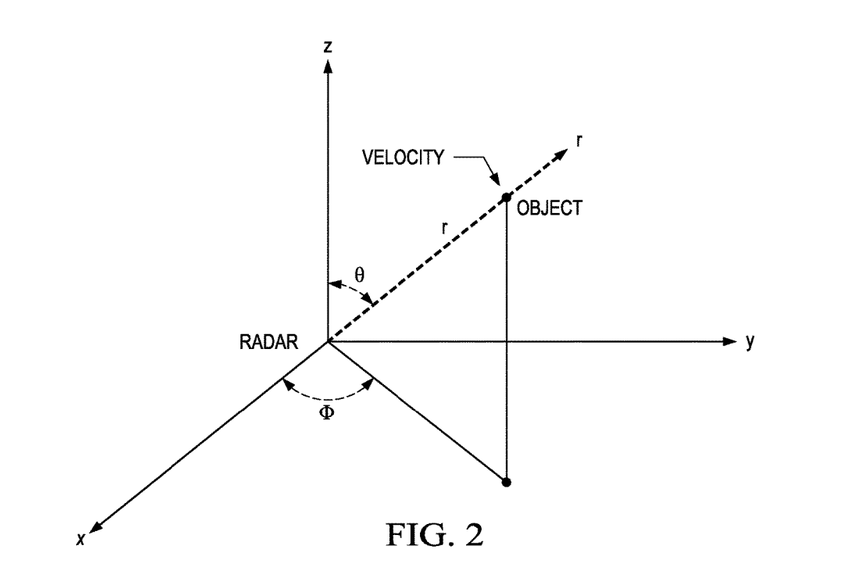
FIG. 2 illustrates radar and object geometry in three dimensions.

The extended Kalman filter, which may be herein referred to as an object tracking filter, used to track objects in embodiments of the disclosure is now described. Processing a frame of multi-channel radar signals received at a time instant n produces estimates of object range r(n), range rate $\dot{r}(n)$, elevation $\varnothing(n)$, and azimuth $\theta(n)$ for each detected object, as well as variances of the estimates give respectively by $\sigma_r^2$, $\sigma_{\dot{r}}^2$, $\sigma_\varnothing^2$, and $\sigma_\theta^2$. As is described in more detail herein, the object tracking filter uses the spherical coordinates of a detected object, the range rate, and the variances to determine the location of an object at time n in Cartesian coordinates x(n), y(n), and z(n) as well as the object velocity in three directions given by $\dot{x}(n)$, $\dot{y}(n)$, and $\dot{z}(n)$, and the object acceleration in three directions given by $\ddot{x}(n)$, $\ddot{y}(n)$, and $\ddot{z}(n)$. FIG. 2 illustrates the radar and object geometry in three dimensions.

The process state vector s(n) of an object at time instant n in the object tracking filter is defined as $$s(n)=[x(n)y(n)z(n)\dot{x}(n)\dot{y}(n)\dot{z}(n)\ddot{x}(n)\ddot{y}(n)\ddot{z}(n)]^T$$

where $[\bullet]^T$ denotes transposition. The object movement over time is represented by the process state model $$s(n)=Fs(n-1)+w(n)$$

where the matrix F regulates the time evolution of the state model by relating the object location, velocity, and acceleration, and is given by $$F=\begin{bmatrix} 1 & 0 & 0 & T & 0 & 0 & T^2/2 & 0 & 0 \\ 0 & 1 & 0 & 0 & T & 0 & 0 & T^2/2 & 0 \\ 0 & 0 & 1 & 0 & 0 & T & 0 & 0 & T^2/2 \\ 0 & 0 & 0 & 1 & 0 & 0 & T & 0 & 0 \\ 0 & 0 & 0 & 0 & 1 & 0 & 0 & T & 0 \\ 0 & 0 & 0 & 0 & 0 & 1 & 0 & 0 & T \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{bmatrix}$$

where T is the sampling interval, i.e., the time interval from one frame to the next and w(n) is a vector representing process model error and is given by $$w(n)=[w_x(n)w_y(n)w_z(n)w_{\dot{x}}(n)w_{\dot{y}}(n)w_{\dot{z}}(n)w_{\ddot{x}}(n)w_{\ddot{y}}(n)w_{\ddot{z}}(n)]^T.$$

The covariance matrix corresponding to the vector w(n) is Q. The matrix Q may be derived as follows. First, define $\tilde{Q}$ as $$\tilde{Q}=\begin{matrix} T^5/20 & T^4/8 & T^3/6 \\ T^4/8 & T^3/3 & T^2/2 \\ T^3/6 & T^2/2 & T \end{matrix}.$$

The matrix Q is initialized as a 9×9 matrix in which all elements are zero. Then, set $Q(1:3:7, 1:3:7)=\tilde{Q}\times\sigma_{w_x}^2$, where Q(1:3:7, 1:3:7) represents rows 1, 4, and 7 and columns 1, 4, and 7 of matrix Q. Similarly, set $Q(2:3:8, 2:3:8)=\tilde{Q}\times\sigma_{w_y}^2$ and $Q(3:3:9, 3:3:9)=\tilde{Q}\times\sigma_{w_z}^2$. The variances of $w_x(n)$, $w_y(n)$, and $w_z(n)$ are represented by $\sigma_{w_x}^2$, $\sigma_{w_y}^2$, and $\sigma_{w_z}^2$, respectively. The object tracking filter may be tuned by selecting appropriate values for the variances $w_x(n)$, $w_y(n)$, and $w_z(n)$. In some embodiments, empirically selected values for these variances are used. In some embodiments, the initial variances may be set to small values and modified during execution.

The measurement vector u(n), i.e., the measurements of the spherical coordinates and rate range of an object at time instant n, is given by $$u(n)=[r(n)\theta(n)\varnothing(n)\dot{r}(n)]^T.$$

The measurement vector u(n) is related to the process state vector s(n) as given by $$u(n)=H(s(n))+v(n)$$

where the non-linear function H(•) transforms the Cartesian coordinates of the object to the corresponding set of spherical coordinates, and the vector v(n) is a vector of measurement noise given by $$v(n)=[v_r(n)v_\theta(n)v_\varnothing(n)v_{\dot r}(n)]$$

where the covariance matrix R associated with the vector v(n) is given by $$R=\text{diag}[\sigma_r^2 \sigma_\theta^2 \sigma_\varnothing^2 \sigma_{\dot r}^2]$$

where diag[•] is a diagonal matrix formed from the elements of the argument. Given the previous defined process state vector s(n), the non-linear transformation H(s(n)) becomes $$H(s(n)) = \begin{bmatrix} \sqrt{x^2+y^2+z^2} \\ \cos^{-1}\left(\dfrac{z}{\sqrt{x^2+y^2+z^2}}\right) \\ \tan^{-1}\dfrac{y}{x} \\ \dfrac{x\dot x+y\dot y+z\dot z}{\sqrt{x^2+y^2+z^2}} \end{bmatrix}$$

in which the time index (n) is not shown for the sake of brevity.

To retain the diagonal structure of the measurement covariance matrix R, input measurements are in spherical coordinates and the object tracking filter dynamically estimates the state vector s(n). The non-linear relations between u(n) and s(n) is simplified by retaining just the first term in the Taylor series expansion of H(s(n)), i.e., $$u(n)=H(\hat s^-(n))+J_H(\hat s^-(n))[s(n)-\hat s^-(n)]+v(n)$$

where $J_H(\bullet)$ is the Jacobian given by $$J_H(s) = \begin{bmatrix} \dfrac{\partial r}{\partial x} & \dfrac{\partial r}{\partial y} & \dfrac{\partial r}{\partial z} & \dfrac{\partial r}{\partial \dot x} & \dfrac{\partial r}{\partial \dot y} & \dfrac{\partial r}{\partial \dot z} & \dfrac{\partial r}{\partial \ddot x} & \dfrac{\partial r}{\partial \ddot y} & \dfrac{\partial r}{\partial \ddot z} \\ \dfrac{\partial \theta}{\partial x} & \dfrac{\partial \theta}{\partial y} & \dfrac{\partial \theta}{\partial z} & \dfrac{\partial \theta}{\partial \dot x} & \dfrac{\partial \theta}{\partial \dot y} & \dfrac{\partial \theta}{\partial \dot z} & \dfrac{\partial \theta}{\partial \ddot x} & \dfrac{\partial \theta}{\partial \ddot y} & \dfrac{\partial \theta}{\partial \ddot z} \\ \dfrac{\partial \phi}{\partial x} & \dfrac{\partial \phi}{\partial y} & \dfrac{\partial \phi}{\partial z} & \dfrac{\partial \phi}{\partial \dot x} & \dfrac{\partial \phi}{\partial \dot y} & \dfrac{\partial \phi}{\partial \dot z} & \dfrac{\partial \phi}{\partial \ddot x} & \dfrac{\partial \phi}{\partial \ddot y} & \dfrac{\partial \phi}{\partial \ddot z} \\ \dfrac{\partial \dot r}{\partial x} & \dfrac{\partial \dot r}{\partial y} & \dfrac{\partial \dot r}{\partial z} & \dfrac{\partial \dot r}{\partial \dot x} & \dfrac{\partial \dot r}{\partial \dot y} & \dfrac{\partial \dot r}{\partial \dot z} & \dfrac{\partial \dot r}{\partial \ddot x} & \dfrac{\partial \dot r}{\partial \ddot y} & \dfrac{\partial \dot r}{\partial \ddot z} \end{bmatrix} =$$

$$\begin{bmatrix} \dfrac{x}{r} & \dfrac{y}{r} & \dfrac{z}{r} & 0 & 0 & 0 & 0 & 0 & 0 \\ \dfrac{xz}{r^2\sqrt{x^2+y^2}} & \dfrac{yz}{r^2\sqrt{x^2+y^2}} & \dfrac{-\sqrt{z^2+y^2}}{r^2} & 0 & 0 & 0 & 0 & 0 & 0 \\ \dfrac{-y}{x^2+y^2} & \dfrac{x}{x^2+y^2} & 0 & 0 & 0 & 0 & 0 & 0 & 0 \\ \dfrac{y(\dot xy-x\dot y)+}{z(\dot xz-x\dot z)} & \dfrac{x(\dot yx-\dot xy)+}{z(\dot yz-y\dot z)} & \dfrac{y(\dot xy-x\dot y)+}{z(\dot xz-x\dot z)} & \dfrac{x}{r} & \dfrac{y}{r} & \dfrac{z}{r} & 0 & 0 & 0 \end{bmatrix}$$

in which the time index (n) is not shown for the sake of brevity. In these equations, the a priori state estimates $\hat s^-(n)$ are obtained from measurements until time n−1, while the a posteriori state estimates $\hat s(n)$ are updated when u(n) becomes available.

The a priori error covariance $P^-(n)$ is defined as $$P^-(n)=\text{Cov}[s(n)-\hat s^-(n)].$$

The a posteriori error covariance P(n) is defined as $$P(n)=\text{Cov}[s(n)-\hat s(n)].$$

Based on the above description, a detected object may be tracked as follows. At time instance 0, i.e., the first time a particular object is detected, initialize the state ŝ(0) of an object tracking filter for the object to the location estimates for the object and initialize the a posteriori error covariance matrix P(0) to the identity matrix. Then, at each subsequent time instance in which the object is detected, execute time update computations and measurement update computations. The time update computations are given by $$\hat s^-(n)=F\hat s(n-1)$$

$$P^-(n)=FP(n-1)F^T+Q$$

and measurement update computations are given by $$K(n)=P^-(n)J_H^T(\hat s^-(n))[J_H(\hat s^-(n))P^-(n)J_H^T(\hat s^-(n))+R]^{-1}$$

$$\hat s(n)=\hat s^-(n)+K(n)[u(n)-H(\hat s^-(n))]$$

$$P(n)=P^-(n)-K(n)J_H(\hat s^-(n))P^-(n)$$

where K(n) is commonly referred to as Kalman gain or blending factor. Kalman gain can be thought of as an adaptation or weighting factor that governs how much the state parameters are changed from one time instant to the next. A larger gain value allows a larger change, whereas a smaller value allows a smaller change. The gain is automatically adjusted based on object dynamics obtained from the state parameters.

Figure 3:
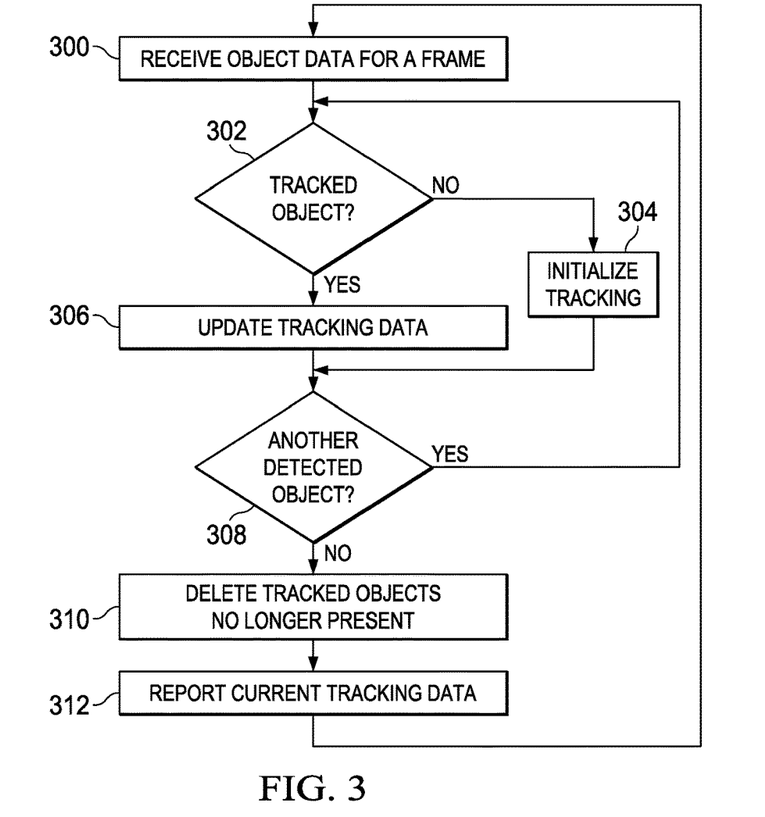
FIG. 3 is a flow diagram of a method for object tracking.

FIG. 3. is a flow diagram of a method for tracking objects in a radar system. The method employs an extended Kalman filter, i.e., an object tracking filter, as previously described herein to track objects detected in radar signals. The method as depicted is performed for each frame of radar signals. Initially, object data is received 300 for a frame of radar signals. The object data includes the number of objects detected, and for each object, the spherical coordinates, i.e., r(n), Ø(n), and θ(n), the range rate ṙ(n), and the variances for the spherical coordinates and the range rate, i.e., $\sigma_r^2$, $\sigma_{\dot r}^2$, $\sigma_\varnothing^2$, and $\sigma_\theta^2$.

Each detected object is then considered in turn 302-308. First, a determination 302 is made as to whether or not the current object is already being tracked. Any suitable technique for data association may be used to make this determination. Note that if multiple objects are detected, each object is tracked independently with a separate object tracking filter. Data association attempts to assign incoming measurements for detected objects to objects already being tracked. In some embodiments, a suitable nearest-neighbor data association technique may be used. One such technique is described in M. Z. Ikram and M. Ali, "A New Data Association Method for 3-D Object Tracking in Automotive Applications," Proceedings of the 2014 IEEE Radar Conference, May 19-23, 2014, pp. 1187-1191 ("Ikram" herein), which is incorporated by reference herein.

The technique in Ikram is based on comparing the location of an existing tracked object with that of each incoming object and associating to the one that is closest in 3D space. Further, the described data association technique is particularly suited to applications such as automotive applications as the technique can be implemented using low cost processors. Note that the filter used in the paper does not consider acceleration, whereas the object tracking filter described herein includes acceleration. One of ordinary skill in the art will understand adaptation of the described data association technique for the object tracking filter described herein.

If a detected object is not one of the objects that is currently being tracked 302, then tracking of the object is initialized 304. More specifically, an object tracking filter for the object is initialized by storing values for the process state vector and the error covariance matrix in memory. In some embodiments, x(n), y(n), and z(n) are each initialized to one and ẋ(n), ẏ(n), ż(n), ẍ(n), ÿ(n), and z̈(n) are each set to 0. The process state vector may be referred to as the track of the object or the tracking vector of the object. In such embodiments, convergence to a more exact state of the object occurs rapidly over subsequent frames. In some embodiments, additional computations may be performed to convert the spherical coordinates for the object to Cartesian coordinates to initialize x(n), y(n), and z(n).

If the detected object is determined to be one of the currently tracked objects, then the tracking data for the object is updated. More specifically, the values of the process state vector and the error covariance matrix stored in memory are updated based on the spherical coordinates, range rate, and variances received for the object. That is, the time update computations and the measurement update computations as previously described herein are performed to update the process state vector ŝ(n) and the error covariance matrix (n). The time update computations compute an interim process state vector and interim error covariance matrix based on the current parameter values in the process state vector. The measurement update computations then use the interim process state vector and interim error covariance matrix along with the spherical coordinates, range rate, and variances received for the object to update the process state vector and the error covariance matrix.

After all of the detected objects are processed 308, any currently tracked objects that were not found in the current frame may be deleted 310, i.e., the process state vector and error covariance matrix for such objects may be deleted. In some embodiments, a tracked object is deleted if the tracked object is not associated with a detected object for some number of consecutive frames of radar signal data. The number of consecutive radar frames may be user defined or may be predetermined.

Current tracking information for all objects being tracked, including new detected objects, is reported 312, e.g., to one or more ADAS applications, for further processing. In some embodiments, the current process state vector and the current error covariance matrix for each tracked object is provided to the one or more ADAS applications.

Figure 4:
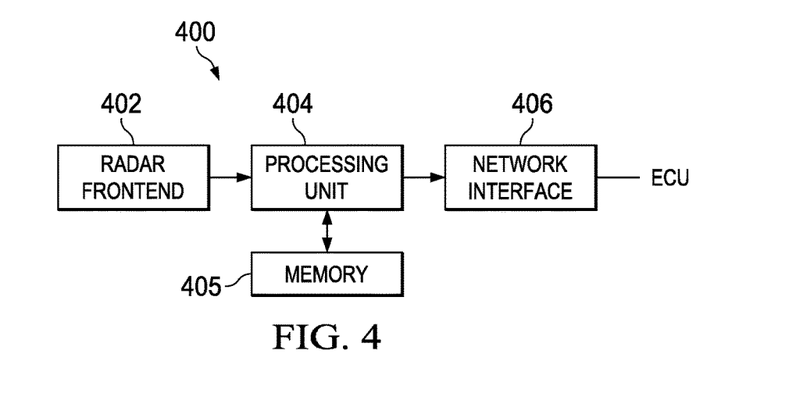
FIGS. 4 and 5 are block diagrams of an example radar system.

FIG. 4 is a block diagram of an example Frequency Modulated Continuous Wave (FMCW) radar system 400 configured to perform object tracking as described herein during operation of the radar system 400. The example FMCW radar system 400 includes a radar frontend 402, a processing unit 404, memory 405, and a network interface 406. An example architecture of the radar frontend 402 is described in reference to FIG. 5.

The radar frontend 402 is coupled to the processing unit 404 via a high speed serial interface. As is explained in more detail in reference to FIG. 5, the radar frontend 402 includes functionality to generate multiple digital intermediate frequency (IF) signals (alternatively referred to as dechirped signals, beat signals, or raw radar signals) that are provided to the processing unit 404 via the high speed serial interface.

The processing unit 404 includes functionality to perform radar signal processing, i.e., to process the received radar signals to determine, for example, range, range rate, azimuth, and elevation of any detected objects. The processing unit 404 also includes functionality to perform post processing of the information about the detected objects to track the objects as per an embodiment of the method of FIG. 3. The processing unit 404 also implements any ADAS applications that use the object tracking data.

The processing unit 404 may include any suitable processor or combination of processors as needed for the processing throughput of the application using the radar data. For example, the processing unit 404 may include a digital signal processor (DSP), a microcontroller (MCU), an SOC combining both DSP and MCU processing, or a field programmable gate array (FPGA) and a DSP.

The memory 405, e.g., a computer readable medium, stores any software instructions for the ADAS applications that are executed by the processing unit 404. The memory 405 may also store any software instructions implementing the object tracking method that are executed by the processing unit 404. Further, the processing unit 404 may store the tracking data for each tracked object in the memory 405. The memory 405 may be may be any suitable type of memory such as, for example, static random access memory (SRAM), dynamic random access memory (DRAM), synchronous DRAM (SDRAM), read-only memory (ROM), flash memory, a combination thereof, or the like.

The processing unit 404 provides control information as needed to one or more electronic control units in the vehicle via the network interface 106. Electronic control unit (ECU) is a generic term for any embedded system in a vehicle that controls one or more the electrical system or subsystems in the vehicle. Types of ECU include, for example, electronic/engine control module (ECM), power train control module (PCM), transmission control module (TCM), brake control module (BCM or EBCM), central control module (CCM), central timing module (CTM), general electronic module (GEM), body control module (BCM), and suspension control module (SCM).

The network interface 406 may implement any suitable protocol, such as, for example, the controller area network (CAN) protocol, the FlexRay protocol, or Ethernet protocol.

Figure 5:
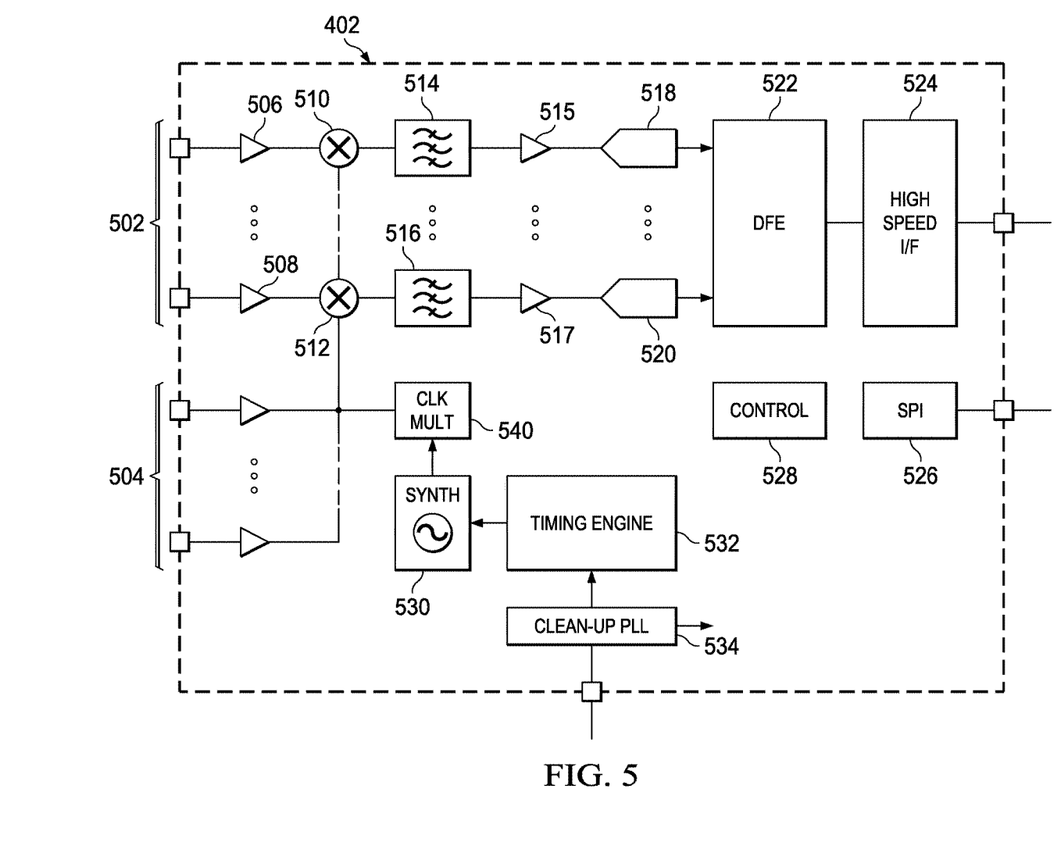

FIG. 5 is a block diagram of an example radar frontend 402. The example radar frontend 402 is a radar transceiver integrated circuit (IC) that includes multiple transmit channels 504 for transmitting FMCW signals and multiple receive channels 502 for receiving the reflected transmitted signals. Further, the number of receive channels may be larger than the number of transmit channels. For example, an embodiment of the radar transceiver IC may have two transmit channels and four receive channels.

A transmit channel includes a suitable transmitter and antenna. A receive channel includes a suitable receiver and antenna. Further, each of the receive channels 502 are identical and include a low-noise amplifier (LNA) 506, 508 to amplify the received signal, a mixer 510, 512 to mix the signal generated by the transmission generation circuitry with the received signal to generate an IF signal, a baseband bandpass filter 514, 516 for filtering the IF signal, a variable gain amplifier (VGA) 515, 517 for amplifying the filtered IF signal, and an analog-to-digital converter (ADC) 518, 520 for converting the analog IF signal to a digital IF signal. The mixer serves as a down converter that generates an output signal with a frequency equal to the difference between the frequency of the inputs received from the low-noise amplifier and the transmission generation circuitry, both of which are radio frequency (RF) signals. The bandpass filter, VGA, and ADC of a receive channel may be collectively referred to as a baseband chain or baseband filter chain.

The receive channels 502 are coupled to the digital front end (DFE) component 522 to provide the digital IF signals to the DFE 522. The DFE 522 includes functionality to perform decimation filtering on the digital IF signals to reduce the data transfer rate. The DFE 522 may also perform other operations on the digital IF signals, e.g., DC offset removal, digital compensation of non-idealities in the receive channels, such as inter-RX gain imbalance non-ideality, inter-RX phase imbalance non-ideality and the like. The DFE 522 is coupled to the high speed serial interface (I/F) 524 to transfer decimated digital IF signals to the processing unit 406.

The serial peripheral interface (SPI) 526 provides an interface for communication with the processing unit 406. For example, the processing unit 406 may use the SPI 526 to send control information, e.g., timing and frequencies of chirps, output power level, triggering of monitoring functions, etc., to the control module 528.

The control module 528 includes functionality to control the operation of the radar SOC 102. The control module 528 may include, for example, an MCU that executes firmware to control the operation of the radar SOC 102.

The programmable timing engine 532 includes functionality to receive chirp parameter values for a sequence of chirps in a radar frame from the control module 528 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, a chirp duration, indicators of when the transmit channels should transmit and when the DFE output digital should be collected for further radar processing, etc. One or more of these parameters may be programmable.

The radio frequency synthesizer (SYNTH) 530 includes functionality to generate FMCW signals for transmission based on chirp control signals from the timing engine 532. In some embodiments, the SYNTH 530 includes a phase locked loop (PLL) with a voltage controlled oscillator (VCO).

The clock multiplier 540 increases the frequency of the transmission signal (LO signal) to the LO frequency of the mixers 506, 508. The clean-up PLL (phase locked loop) 534 operates to increase the frequency of the signal of an external low frequency reference clock (not shown) to the frequency of the SYNTH 530 and to filter the reference clock phase noise out of the clock signal.

Figure 6:
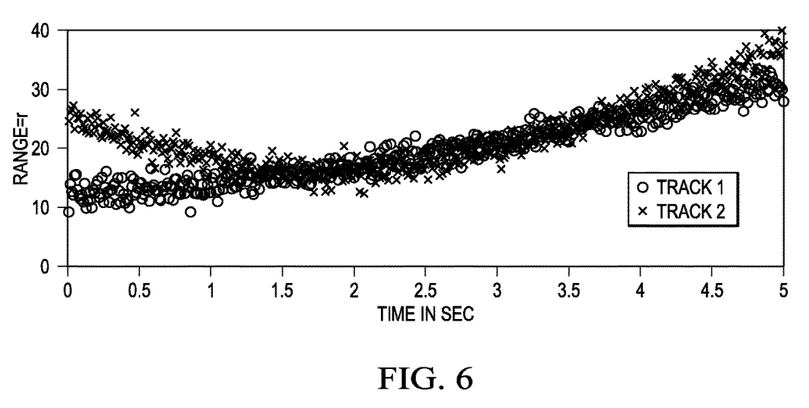
FIGS. 6-8 are graphs illustrating experimental results of an embodiment of the method of FIG. 3.
Figure 7:
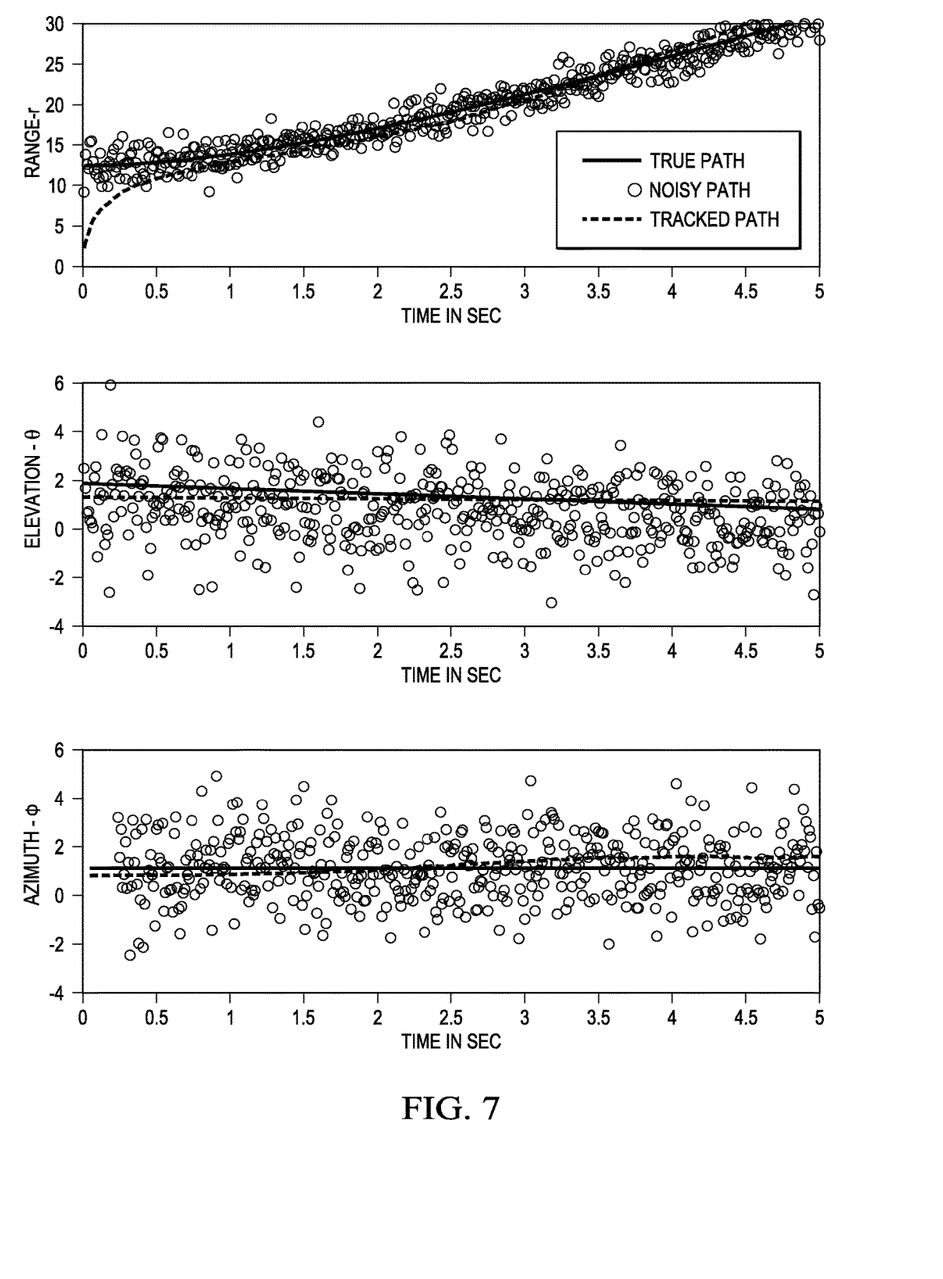
Figure 8:
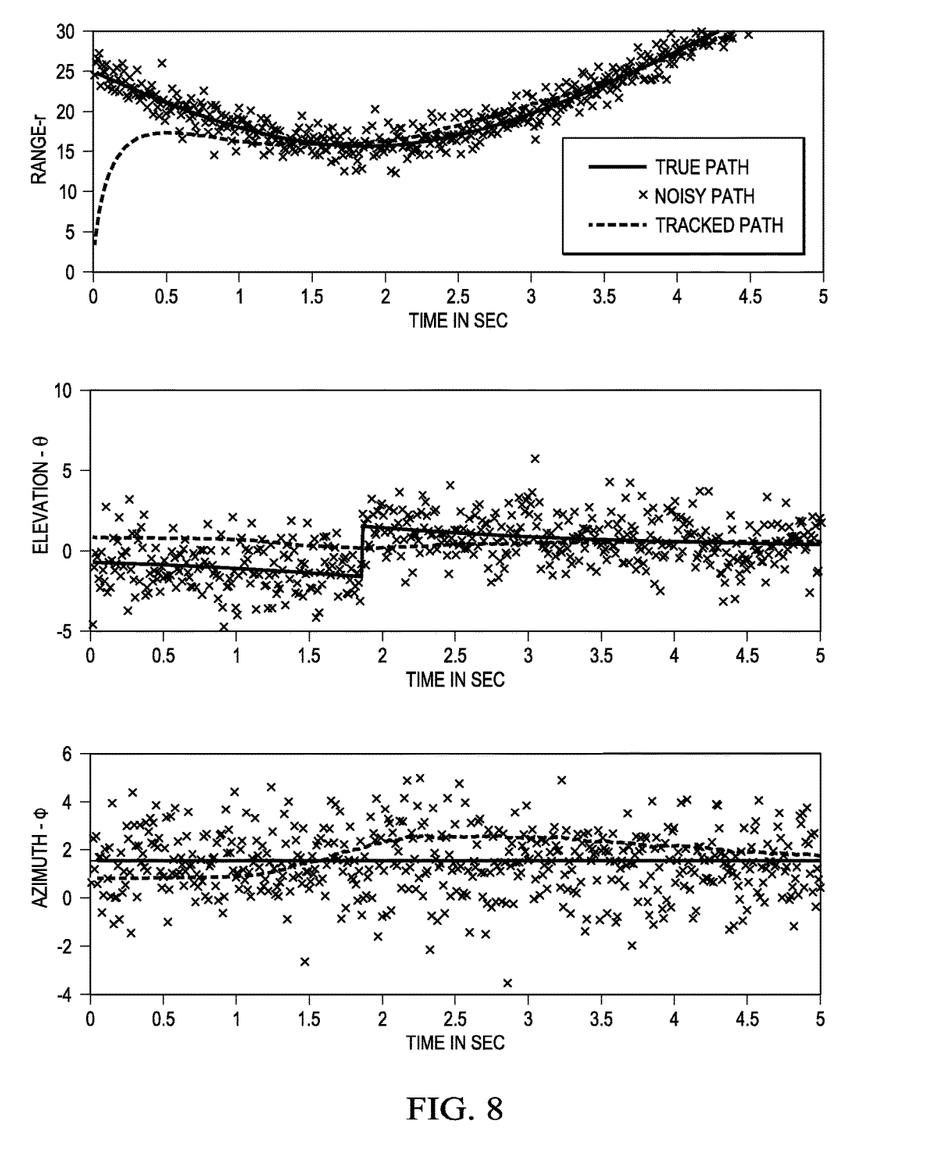

FIGS. 6, 7, and 8 are graphs illustrating the efficacy of an embodiment of the method of FIG. 3. In experiments using this embodiment, two moving objects were considered that started at different locations and moved with constant respective accelerations. The data sampling rate used is T=0.01 msec. FIG. 6 is a graph illustrating the path of the two objects over time. As this graph shows, the objects come closer and stay together before they start to move away from each other.

The process state vectors for the object tracking filters for each object were initialized to $\hat{s}(0)=[1\ 1\ 1\ 1\ 1\ 1\ 1\ 1\ 1]^T$ and the a posteriori error covariance matrices were initialize to $P(0)=I_9$ where $I_9$ is a 9×9 identity matrix. Further, the data association technique of Ikram was used. FIGS. 7 and 8 are graphs illustrating the results, i.e., range, elevation, and azimuth, of the implemented tracking method for each of the tracked objects as compared to the true path and the noisy path of the object.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the tracking is assumed to be for ADAS input. One of ordinary skill in the art will understand that the object tracking described herein may be used for other applications that employ radar and need to track objects, e.g., tracking movement of people in a house or building in surveillance and security applications, tracking human movement inside a vehicle, and maneuvering a robot in a factory or warehouse.

In another example, embodiments have been described herein in which the processing unit and memory are external to the radar frontend. One of ordinary skill in the art will understand embodiments in which the processing unit and memory are included in the radar frontend, e.g., are a processor and memory on the radar transceiver IC.

Embodiments of the method described herein may be implemented in hardware, software, firmware, or any combination thereof. If completely or partially implemented in software, the software may be executed in one or more processors, such as a microcontroller, microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, random access memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method comprising:
   detecting, by a radar system, an object in a radar signal;
   determining, by the radar system, spherical coordinates of the object, a range rate of the object, and variances for the spherical coordinates and the range rate of the object;
   determining, by the radar system, whether the object is currently being tracked;
   updating, by the radar system, a first tracking vector for the object based on the spherical coordinates, range rate, and variances of the object when the object is currently being tracked, wherein the first tracking vector is a first process state vector that is updated based on the received spherical coordinates, received range rate, and the received variances for the spherical coordinates and the range rate; and
   initializing, by the radar system, a second tracking vector for the object when the object is not currently being tracked, wherein the second tracking vector is a second process state vector that is initialized based on the received spherical coordinates, received range rate, and the received variances for the spherical coordinates and the range rate.

2. The method of claim 1, wherein determining whether the object is currently being tracked comprises using data association to determine if an existing tracking vector corresponds to the object.

3. The method of claim 2, comprising:
   deleting, by the radar system, the first tracking vector when the detected object is not associated with the first tracking vector for a number of consecutive frames of radar signals.

4. The method of claim 3, wherein the number of consecutive frames is specified by a user of the radar system.

5. The method of claim 1, wherein updating the first tracking vector comprises:
   executing, by the radar system, time update computations and measurement update computations of the first tracking vector or second tracking vector based on the spherical coordinates, range rate, variances of the object to update the first tracking vector, and an associated error covariance matrix.

6. The method of claim 1, comprising:
   providing, by the radar system, the first tracking vector or second tracking vector to an advance driver assistance system.

7. The method of claim 1, wherein the radar system is installed in a vehicle.

8. A system comprising:
   an object detection component in a radar system configured to detect an object in a multi-channel radar signal, and to estimate range, range rate, range variance, and range rate variance for each detected object;
   a position estimation component in the radar system configured to estimate elevation, azimuth, elevation variance, and azimuth variance for the detected object; and
   an object tracking component in the radar system configured to track detected objects over time in three dimensions based on the range, range rate, range variance, range rate variance, elevation, azimuth, elevation variance, and azimuth variance of the detected objects.

9. The system of claim 8, wherein the object tracking component is configured to maintain a tracking vector for the tracked object, the tracking vector comprising Cartesian coordinates of a location of the tracked object, velocity of the tracked object in three directions, and acceleration of the tracked object in three directions.

10. The system of claim 9, wherein the object tracking component is configured to use data association to determine if an existing tracking vector corresponds to the detected object.

11. The system of claim 9, wherein the object tracking component is configured to update a tracking vector based on the range, range rate, range variance, range rate variance, elevation, azimuth, elevation variance, and azimuth variance of the detected object corresponding to the tracking vector.

12. The system of claim 9, wherein the object tracking component is configured to delete a tracking vector if the object corresponding to the tracking vector is not detected in a number of consecutive frames of radar signals.

13. The system of claim 12, wherein the number of consecutive frames is specified by a user of the radar system.

14. The system of claim 8, wherein the radar system is installed in a vehicle.

15. A system, comprising:
   a processing unit in a radar system; and
   a memory in the radar system storing software instructions that, when executed by the processing unit, cause the radar system to perform a method for tracking an object in three dimensions, the method comprising:
   detecting the object in a radar signal;
   determining spherical coordinates of the object, a range rate of the object, and variances for the spherical coordinates and the range rate of the object;
   determining whether the object is currently being tracked;
   updating a first tracking vector for the object based on the spherical coordinates, range rate, and variances of the object when the object is currently being tracked, wherein the first tracking vector is a first process state vector that is updated based on the received spherical coordinates, received range rate, and the received variances for the spherical coordinates and the range rate; and
   initializing a second tracking vector for the object when the object is not currently being tracked, wherein the second tracking vector is a second process state vector that is initialized based on the received spherical coordinates, received range rate, and the received variances for the spherical coordinates and the range rate.

16. The system of claim 15, wherein determining whether the object is currently being tracked comprises using data association to determine if an existing tracking vector corresponds to the object.

17. The system of claim 16, wherein the method comprises:
   deleting the first tracking vector when the detected object is not associated with the first tracking vector for a number of consecutive frames of radar signals.

18. The radar of claim 17, wherein the number of consecutive frames is specified by a user of the radar system.

19. The system of claim 15, wherein updating the first tracking vector comprises:
   executing time update computations and measurement update computations of the first tracking vector or second tracking vector based on the spherical coordinates, range rate, variances of the object to update the tracking vector, and an associated error covariance matrix.

20. The system of claim 15, wherein the radar system is installed in a vehicle.

* * * * *